United States Patent [19]
Kalapodis et al.

[11] Patent Number: 5,844,464
[45] Date of Patent: Dec. 1, 1998

[54] THERMAL SWITCH

[75] Inventors: James B. Kalapodis, Akron; Jerry L. Polles, Mansfield; William F. Quinn, Greenwich, all of Ohio

[73] Assignee: Therm-O-Disc, Incorporated, Mansfield, Ohio

[21] Appl. No.: 976,774

[22] Filed: Nov. 24, 1997

[51] Int. Cl.$^6$ .......................... H01H 61/00; H01H 37/32; H01M 2/00

[52] U.S. Cl. .............................. 337/140; 429/61; 337/14; 337/298; 337/333

[58] Field of Search .................... 337/140, 139, 337/141, 393, 395, 380, 112, 298–372, 765, 14; 148/563; 429/61, 62, 66, 57, 58, 541, 71, 122, 174

[56] References Cited

U.S. PATENT DOCUMENTS

| | | |
|---|---|---|
| 3,213,250 | 10/1965 | Marcoux .................................. 200/138 |
| 4,782,318 | 11/1988 | Boulanger ................................ 337/380 |
| 4,855,195 | 8/1989 | Georgopoulos et al. . |
| 4,975,341 | 12/1990 | Tucholski et al. . |
| 4,992,339 | 2/1991 | Georgopoulos . |
| 5,188,909 | 2/1993 | Pedicini . |

FOREIGN PATENT DOCUMENTS

| | | |
|---|---|---|
| 59-191273 | 10/1984 | Japan . |
| 59-203376 | 11/1984 | Japan . |
| 63-175345 | 7/1988 | Japan . |

*Primary Examiner*—Leo P. Picard
*Assistant Examiner*—Anatoly Vortman
*Attorney, Agent, or Firm*—Jones, Day, Reavis & Pogue

[57] ABSTRACT

A thermal switch assembly includes a dielectric spacer and a switch blade member of shape memory metal sandwiched between a pair of flat metal plates. The spacer provides a cavity between the plates, and the switch blade member has a switch blade portion projecting into the cavity. The switch blade member has a mounting portion engaging one of the metal plates, and the switch blade portion normally is under bending stress in engagement with the other metal plate to provide a current path between the plates. At elevated temperatures, the switch blade portion of shape memory metal moves out of engagement with the other metal plate to interrupt the current path. Fasteners integral with the dielectric spacer cooperate with the metal plates and the switch blade member to hold the switch assembly together with the spacer and the mounting portion of the switch blade member compressively sandwiched between the metal plates.

30 Claims, 9 Drawing Sheets

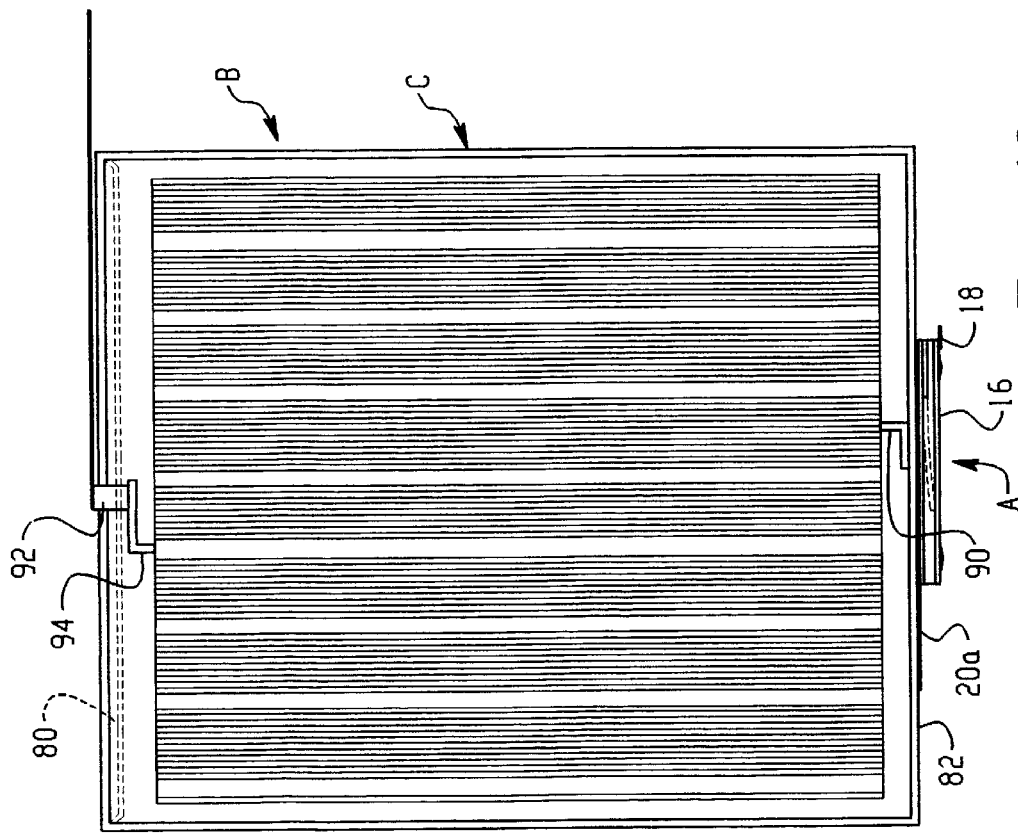
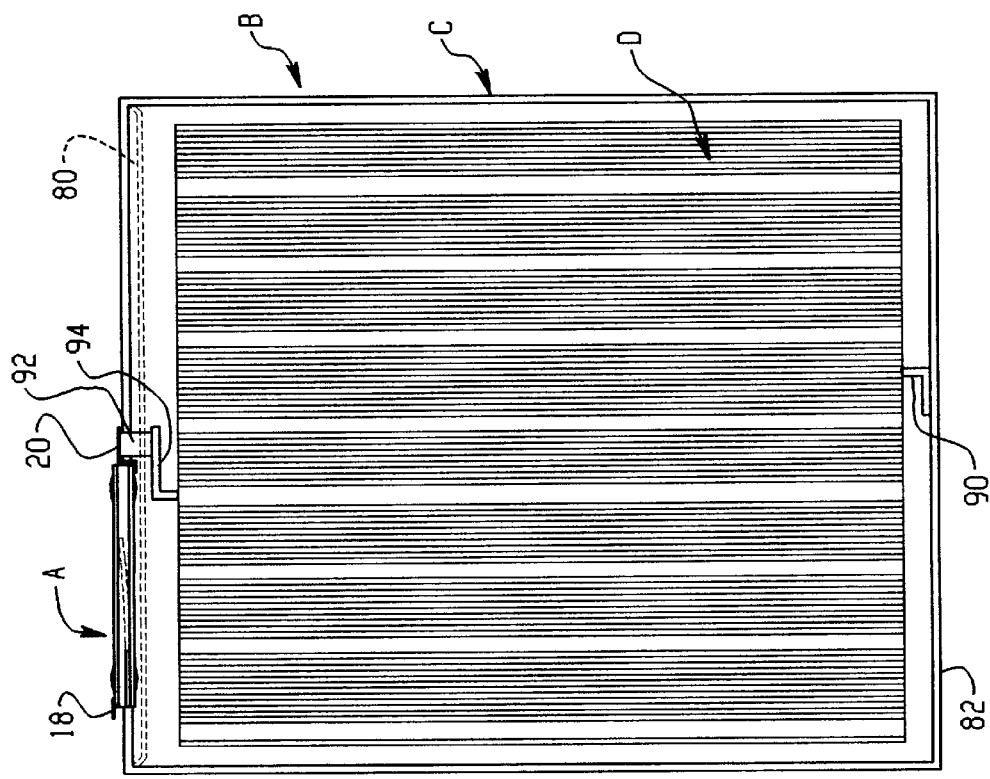

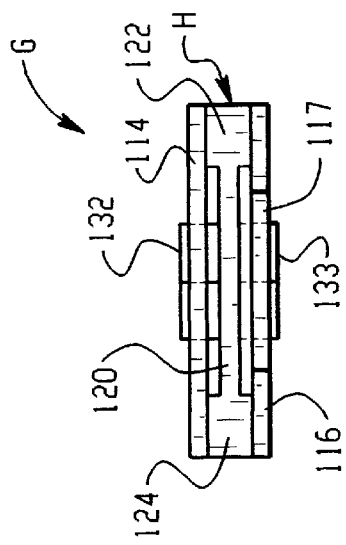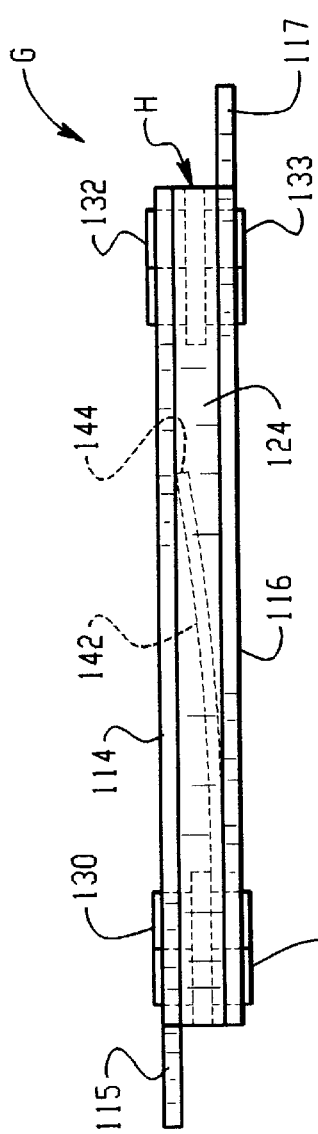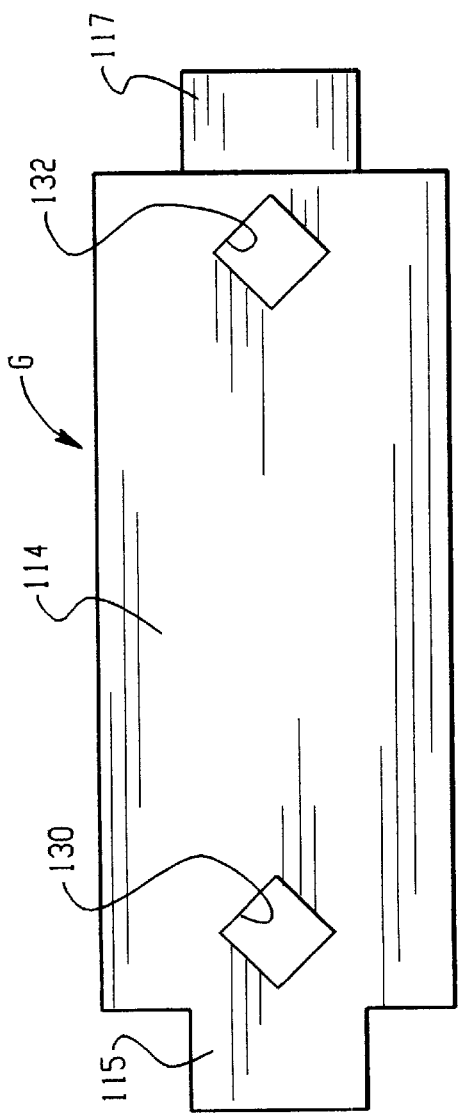

THERMAL SWITCH

BACKGROUND OF THE INVENTION

This application relates to the art of switches and, more particularly, to thermal switches that automatically move from one position to another in response to an elevated temperature. The invention is particularly applicable to a normally closed switch that moves to an open position for preventing thermal runaway in batteries and will be described with specific reference thereto. However, it will be appreciated that the invention has broader aspects and can be used in normally open switches as well as for other purposes.

Overcharging batteries of certain types may cause thermal runaway that raises the internal battery temperature. The internal pressure within the sealed battery case increases with increasing temperature and an explosion may occur when the internal pressure exceeds the bursting strength of the battery case. A battery explosion releases by-products that are caustic, toxic and flammable, and the force of the explosion may cause injury to persons and damage to property.

Thermal protectors of various types have been proposed and used in batteries for interrupting the battery circuit when a predetermined temperature is exceeded. The space available for small rechargeable batteries in modern electronic devices such as cellular telephones requires miniature temperature protection devices. Miniaturization is limited in thermal protectors that use bimetals or thermistors having a positive temperature coefficient of resistance because such devices do not operate properly or reliably if they are made too small.

Arrangements have been proposed for incorporating a thermal switch actuator of shape memory alloy into the physical structure of a battery internally of the battery case. Such arrangements cannot be used with existing battery designs and it would be desirable to have a self-contained thermal switch assembly with a current carrying actuator of shape memory alloy that could be used for a variety of purposes including external attachment to a battery case.

SUMMARY

A normally closed miniature thermal switch has a current carrying switch blade actuator of shape memory metal that automatically moves to an open position in response to an elevated temperature or an overcurrent condition.

The switch blade is on a switch blade member that is sandwiched with a dielectric spacer between a pair of substantially flat metal plates with the switch blade projecting into a cavity between the plates that is formed by an opening in the spacer. A mounting portion of the switch blade member engages one of the plates and the outer end of the switch blade engages the other plate. The switch blade responds to an elevated temperature to move its outer end away from the other plate and open the circuit.

The switch blade preferably remains in its open position after cooling so that it functions as a one-shot fuse that cannot be reset.

In a preferred arrangement, the entire outer surfaces of the metal parts of the switch assembly are coated with a precious metal. The precious metal coating preferably is on the outer peripheral surfaces of the metal parts as well as the opposite surfaces thereof.

The entire switch assembly may be encapsulated or wrapped in an electrical insulating material with electrical terminals on the switch assembly projecting through the insulating material.

The current carrying switch blade actuator of shape memory metal has an outer end that engages an inner surface of a metal plate with substantially line contact in the switch closed position.

The thermal switch in accordance with the present application preferably has a resistance that is less than 20 milliohms, more preferably less than 10 milliohms and most preferably not more than about five milliohms.

In a preferred arrangement, the one-piece dielectric spacer has integral fastener projections that cooperate with the metal plates to hold the switch assembly together.

In one arrangement, the fastener projections on the dielectric spacer extend through holes in the metal plates and are deformed on the opposite sides of the metal plates from the spacer to complete the assembly.

In accordance with another aspect of the application, the dielectric spacer has at least one reduced thickness end portion defining at least one notch in which a mounting portion of the switch blade member is received. The depth of the notch preferably is not greater than the thickness of the mounting portion of the switch blade member and most preferably is slightly less than the thickness thereof. This insures good compressive engagement between the mounting portion of the switch blade member and the inner surface of a metal plate.

The switch blade member preferably has a thickness that is not greater than the thickness of the spacer, and the spacer has a thickness that is not greater than about 0.050 inches.

In a preferred arrangement, the current carrying switch blade actuator in its deformed martensitic state is under less than about 8% bending strain and most preferably not more than about 4%.

The current carrying switch blade actuator is placed in bending stress between the metal plates to insure good contact and provide low resistivity.

The metal plate of the switch assembly that engages the mounting portion of the switch blade member is attached to a battery terminal or a battery case externally of the battery case. Heat is conducted from the battery case or battery terminal to the switch blade member through the metal plate. Although the switch blade member may be designed to have many different operating temperatures, it may be designed to open at any temperature up to about 125° C. when used with conventional small rechargeable batteries, and most preferably at a temperature in the range of 65°–75° C.

It a principal object of the present invention to provide an improved thermal switch assembly.

It is another object of the invention to provide a self-contained thermal switch assembly that uses a current carrying switch blade actuator of shape memory alloy.

It is a further object of the invention to provide a thermal switch assembly that can be attached externally of a battery for protecting the battery against thermal runaway.

It is an additional object of the invention to provide a miniature thermal switch assembly that has a current carrying switch blade actuator of shape memory metal and is relatively simple and economical to manufacture and assemble.

It also is an object of the invention to provide a current limiting switch assembly that has a current carrying actuator of shape memory metal.

BRIEF DESCRIPTION OF THE DRAWING

FIG. 11 is a side elevational view showing the switch assembly mounted on top of a battery case having a negative terminal and a positive case;

FIG. 12 is a side elevational view of a battery showing the switch assembly mounted on the bottom of a battery case that has a positive terminal and a negative case;

FIG. 17 is a side elevational view of another embodiment;

FIG. 18 is an end elevational view thereof;

FIG. 19 is a top plan view thereof;

DESCRIPTION OF A PREFERRED EMBODIMENT

Figure 1:
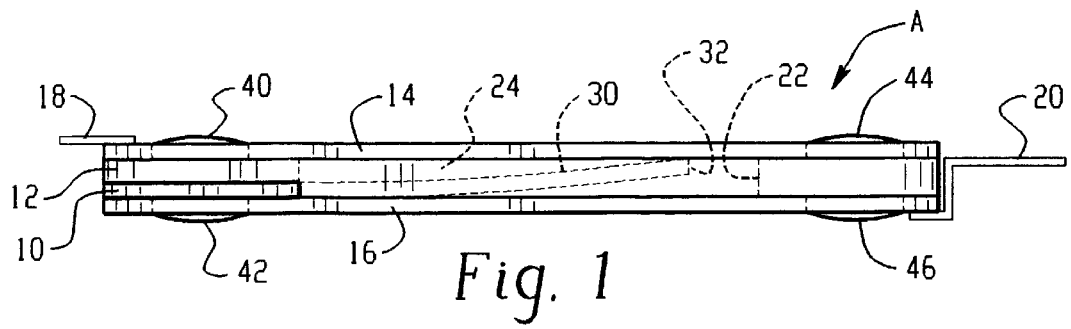
FIG. 1 is a side elevational view of a thermal switch constructed in accordance with the present application.
Figure 2:
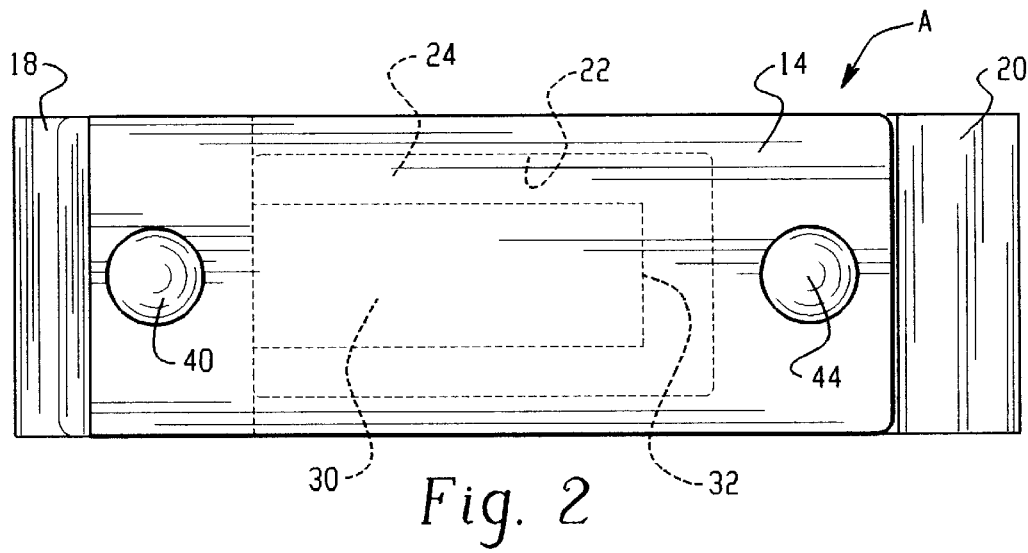
FIG. 2 is a top plan view thereof.

Referring now to the drawing, wherein the showings are for purposes of illustrating a preferred embodiment of the invention only and not for purposes of limiting same, FIGS. 1 and 2 show a switch assembly A having a switch blade member 10 of shape memory metal and a dielectric spacer 12 sandwiched between a pair of substantially flat rectangular metal plates 14, 16.

A nickel foil terminal 18 is welded to an outside surface of plate 14 adjacent one end of switch assembly A and projects outwardly therefrom for connecting switch assembly A in an electrical circuit. Another nickel foil terminal 20 is welded to an outside surface of plate 16 adjacent the end of switch assembly A opposite from terminal 18 and projects outwardly therefrom for connection in an electrical circuit.

Spacer 12 is molded in one-piece of plastic material and has a substantially rectangular opening 22 therein for providing a cavity 24 between metal plates 14, 16. Switch blade member 10 has an elongated switch blade portion 30 extending into cavity 24 and normally is upwardly bent or curved as shown in FIG. 1 with an edge at end 32 engaging an inner surface of plate 14 with line contact to complete an electric circuit between plates 14, 16. Switch blade member 10 is of shape memory metal and responds to an elevated temperature by automatically moving away from plate 14 back toward a substantially flat position to open the circuit between plates 14, 16. Switch blade portion 30 also defines a current carrying actuator and switch contact of shape memory metal.

Figure 3:
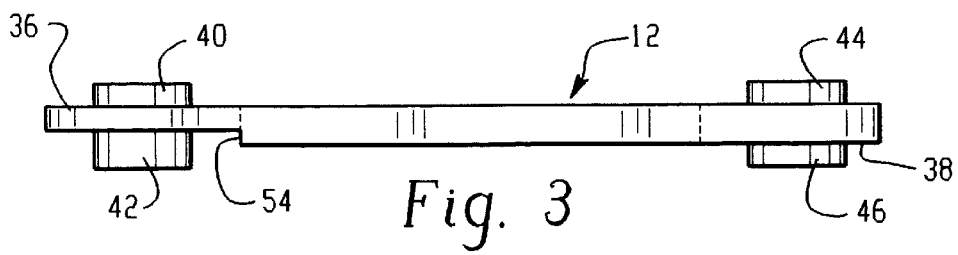
FIG. 3 is a side elevational view of a dielectric spacer used in the thermal switch assembly of FIGS. 1 and 2.
Figure 4:
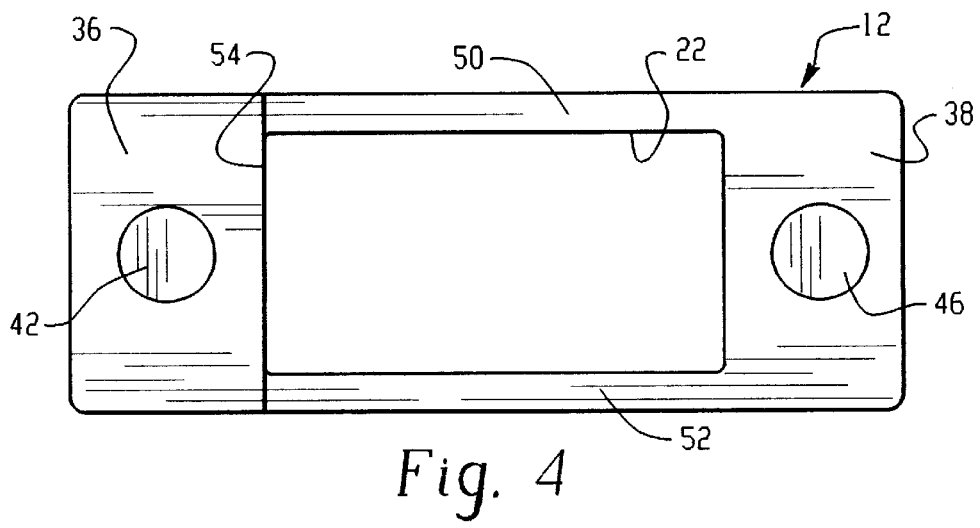
FIG. 4 is a bottom plan view thereof.

With reference to FIGS. 3 and 4, spacer 12 has opposite end areas 36, 38 with integral fastener projections 40, 42 and 44, 46 extending outwardly therefrom in opposite directions. Each fastener projection 40–46 is a substantially cylindrical protuberance centrally located on end areas 36, 38 and extending outwardly therefrom a distance slightly greater than the thickness of each metal plate 14, 16. Spacer webs 50, 52 connect end areas 36, 38 to define the boundaries of rectangular spacer opening 22. One surface of end area 36 on spacer 12 is notched as indicated at 54 in FIGS. 3 and 4 so that spacer end area 36 has a reduced thickness.

Figure 5:
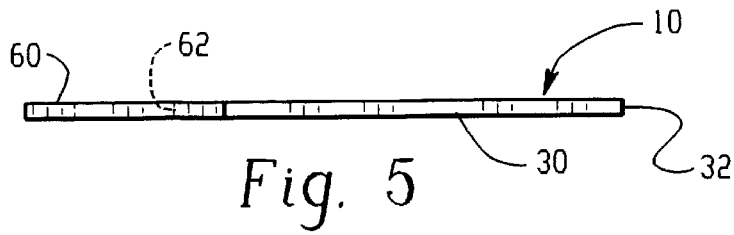
FIG. 5 is a side elevational view of a switch blade member.
Figure 6:
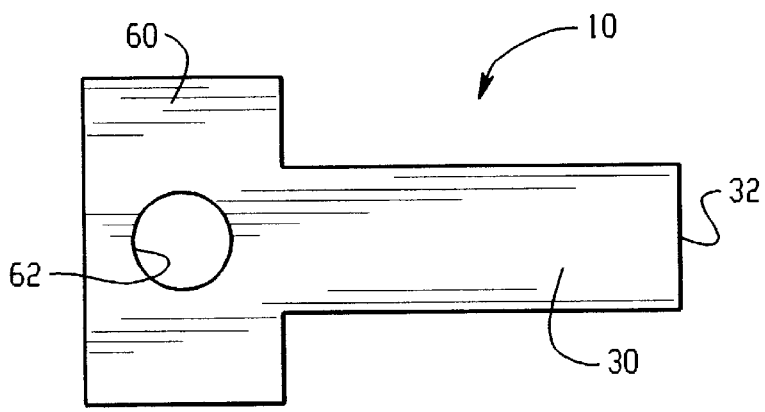
FIG. 6 is a top plan view thereof.

With reference to FIGS. 5 and 6, switch blade member 10 is shown as being substantially T-shaped with a substantially rectangular mounting portion 60 having an elongated switch blade portion 30 extending outwardly therefrom. A centrally located circular hole 62 is provided in mounting portion 60. The length of switch blade actuator portion 30 preferably is less than 0.50 inch, more preferably less than 0.40 inch and most preferably less than about 0.30 inch.

Figure 7:
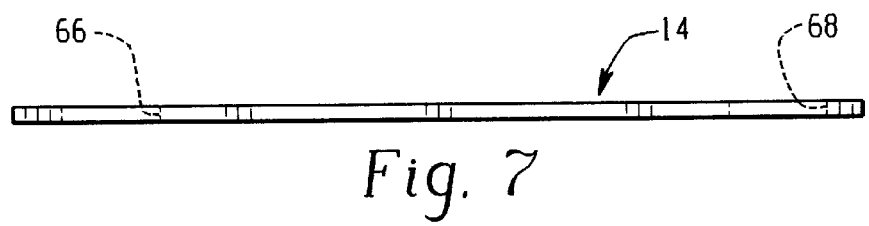
FIG. 7 is a side elevational view of a metal plate used in the switch assembly of FIGS. 1 and 2.
Figure 8:
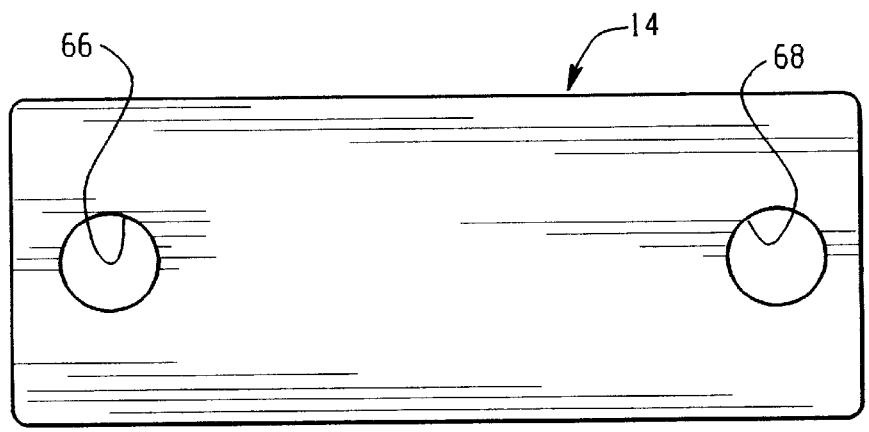
FIG. 8 is a top plan view thereof.

FIGS. 7 and 8 show a substantially rectangular and substantially flat metal plate 14 having circular holes 66, 68 adjacent the opposite ends thereof. It will be recognized that substantially flat and substantially rectangular metal plate 16 has the same construction as plate 14 shown in FIGS. 7 and 8. The circular holes in plate 16 are identified by numerals 70, 72 in FIG. 9.

Figure 9:
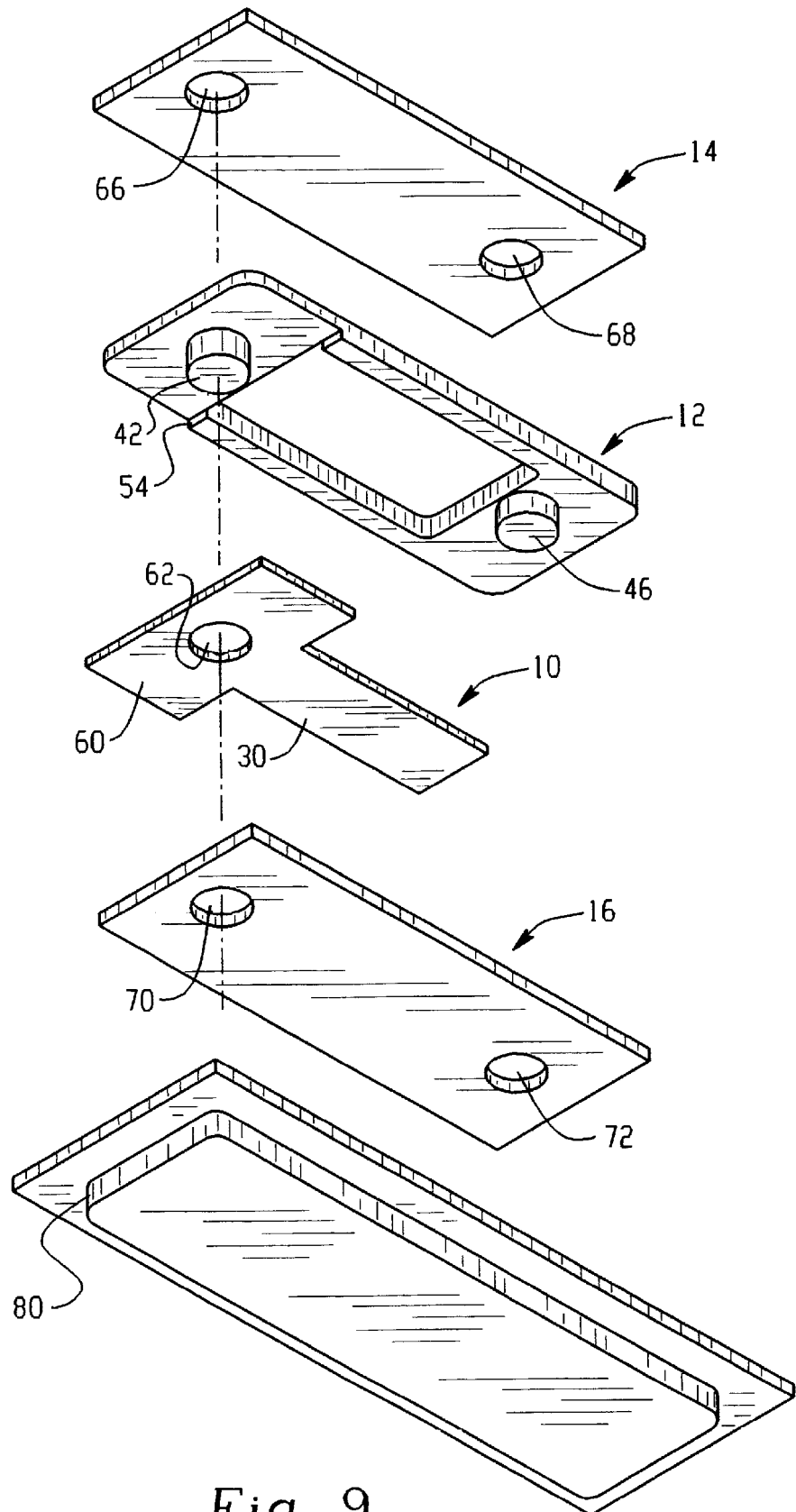
FIG. 9 is an exploded perspective illustration of the switch assembly of FIGS. 1 and 2 along with a cover of a battery housing on which the switch assembly is mountable.
Figure 10:
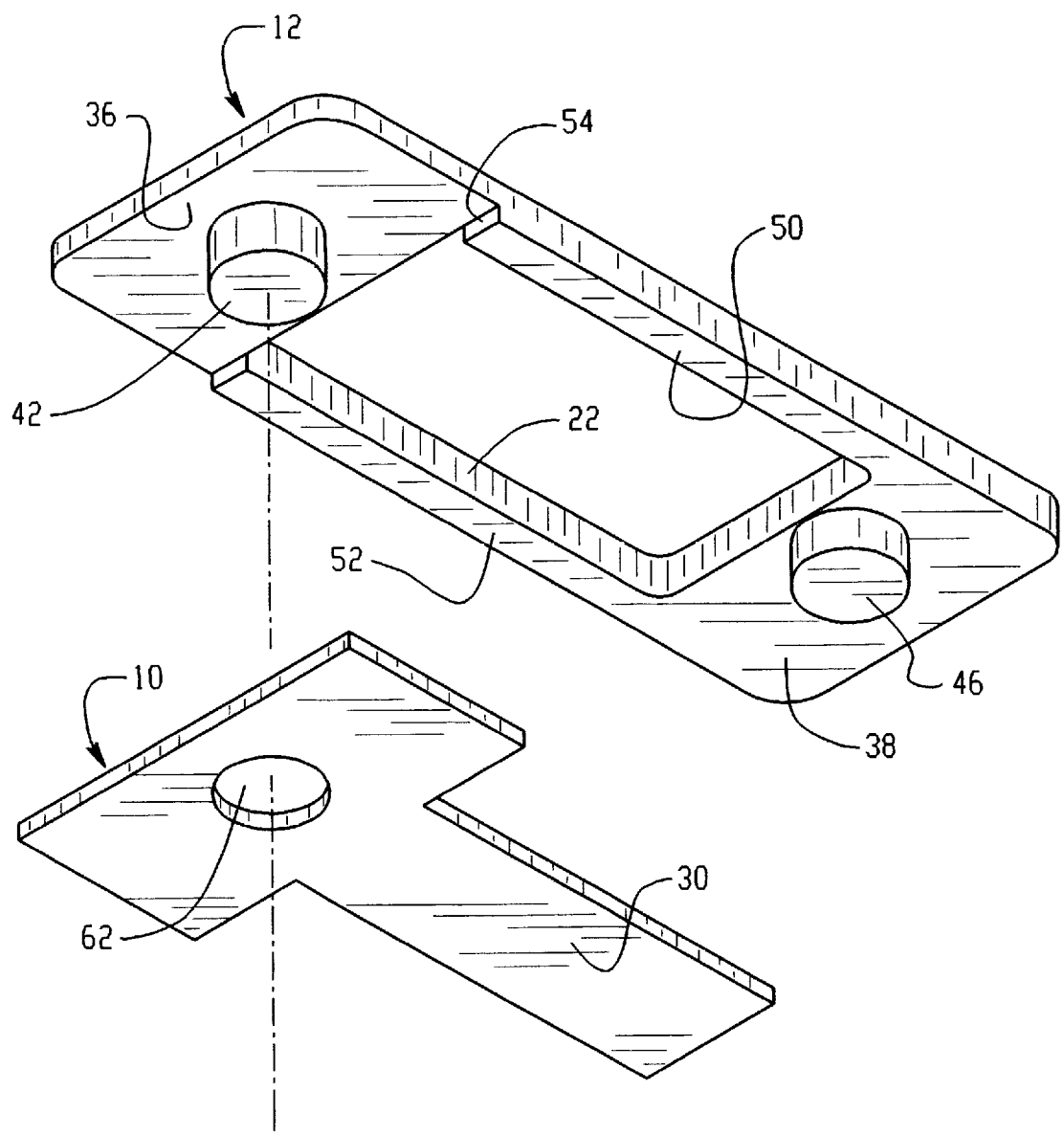
FIG. 10 is an enlarged perspective illustration of a dielectric spacer showing how a mounting portion of a switch blade member is received in a spacer notch.

With reference to FIG. 9, the switch is assembled by positioning mounting portion 60 of switch blade member 10 within notch 54 in spacer 12, and with fastener projection 42 extending through hole 62. Spacer projections 42, 46 are extended through holes 70, 72 in plate 16. The opposite spacer projections 40, 44 that are not shown in FIG. 9 are extended through holes 66, 68 in plate 14. The entire assembly is then held in compression while spacer projections 40–46 are deformed outwardly by ultrasonic or thermal energy to a diameter larger than holes 66–72 to complete the assembly. Mounting portion 60 of switch blade member 10 is under compression in engagement with the inner surface of plate 16 for good contact.

FIGS. 11 and 12 are cut away views of a typical battery B having a case C that includes a top or cover 80 having a depression therein and a bottom 82. An electrode assembly D positioned within battery case C has one electrode connected to battery case C as by wire 90 and its other electrode connected by a wire 94 to battery terminal 92 that extends through battery cover 80. In FIG. 11, wires 90 and 94 are connected to the positive and negative electrodes so that battery terminal 92 is negative and battery case C is positive. FIG. 12 has the reverse arrangement with wires 90 and 94 respectively connected so that battery terminal 92 is positive and battery case C is negative.

Battery case C may be of metal or a plastic that is electrically conductive or coated with an electrically conductive metal. Electrode assembly D may be of many types including stacked, plate and spirally wound, and is generally shown as a spirally wound type. In such a construction, strips of anode and cathode material with a separator strip between them are wound into a shape for reception in the open top container portion of the battery case that has integral peripheral and bottom walls. The anode material is a consumable metal and the cathode material is reducible by electrochemical action. The separator is a porous electrical insulator material that is ionically conductive. The electrode assembly is inserted into the container forming the battery case, and an electrolyte of solvent containing a conductive solute is added to the container. The cover then is attached sealingly to the open top of the container portion to seal the electrode assembly and electrolyte within the battery case.

FIG. 11 shows switch assembly A received within the depression in battery cover 80, and with nickel foil electrode 20 welded to battery terminal 92. In FIG. 12, a flat nickel foil terminal 20a extends outwardly from metal plate 16 in place of angled terminal 20 and is welded to bottom 82 of battery case C. The entire switch assembly except for the terminals preferably is encapsulated or wrapped in electrical insulating material. Plastic material may be molded over the switch assembly, shrink wrap material may be used or wrapping in tape.

Switch blade member 10 preferably is of nickel-titanium shape memory alloy. However, it will be appreciated that other shape memory alloys could be used, such as copper-based ternaries including copper- zinc-aluminum and copper-nickel-aluminum. The transition temperature range at which the alloy changes from its deformed shape to its recovered shape also can be varied significantly by selecting different shape memory alloy compositions and by varying heat treating processes.

Figure 13:
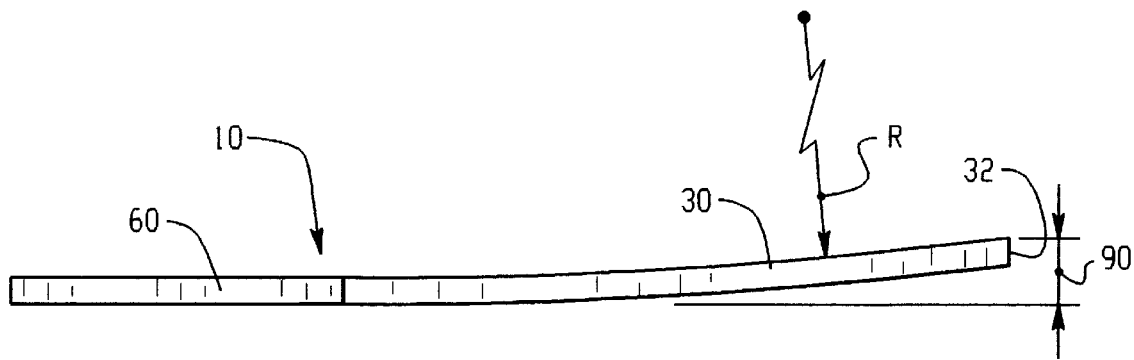
FIG. 13 is a side elevational view of a switch blade member.

Switch blade member 10 is stamped and cut to its flat configuration shown in FIGS. 5 and 6, and is then heated to its austenitic transformation temperature followed by cooling to its martensitic temperature. Switch blade portion 30 then is bent to a permanently deformed position relative to mounting portion 60 as shown in FIG. 13. With switch blade portion 30 deformed as shown in FIG. 13, it is under approximately 4% strain as determined by the formula e=1/[(2R/t)+1], where e is the percent strain, R is the radius of curvature for switch blade portion 30 as shown in FIG. 13 and t is the thickness of switch blade portion 30. The amount of bending strain preferably is less than about 8% and most preferably less than about 4%. It will be recognized that this is an approximation for the amount of strain that is in switch blade portion 30.

The limit on the percent strain is desirable so that the switch will not reclose once it opens. Although the switch blade member can be heat treated and deformed so that it will return to its closed position upon cooling, it is preferred in accordance with the present application to have a switch blade member that remains open even after cooling. Thus, when the switch blade portion moves from a closed position to an open position in response to an elevated temperature condition, it remains open even after the elevated temperature condition no longer exists. If the switch blade portion is deformed beyond the percent strain indicated, it will cause permanent yield of metal beyond the elastic limit which may cause it to return to its closed position upon cooling. Thus, a switch that may reclose upon cooling can be obtained if so desired by initially bending the switch blade actuator to greater than about 8% strain.

Dielectric spacer 12 preferably is of a relatively hard material that has a high tensile strength, low water absorption and a high heat deflection temperature. The material preferably has a tensile strength of at least 15,000 psi and more preferably at least 20,000 psi. The heat deflection temperature at 264 psi preferably is at least 500° F. The water absorption after 24 hours at 73° F. is preferably not greater than about 0.02%. Dielectric spacer 12 may be made of many different materials having these desirable properties and one example is glass filled polyphenylenesulfide. One suitable material is available from General Electric Company under the name SupecG410T. Another suitable material is available from RTP Co. under the name RTP1300 P-1 series. Another material available from General Electric Company is Valox EF4530 PBTP Resin. All of these materials are glass reinforced and other materials having these desirable properties also are available.

Figure 14:
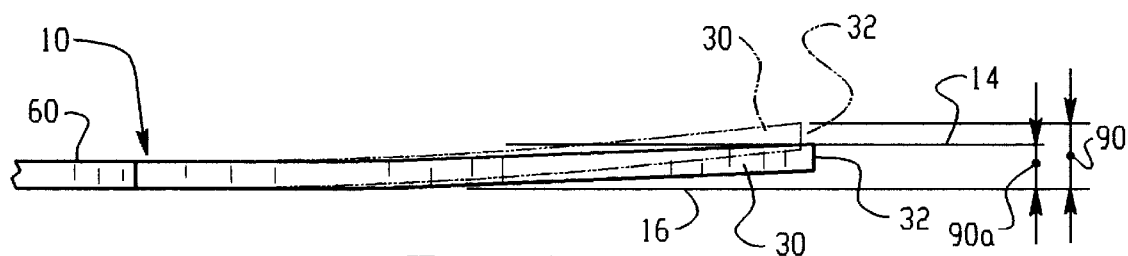
FIG. 14 is a side elevational view of the switch blade member under bending stress between a pair of metal plates.

The vertical extent of switch blade arm 30 in its deformed martensitic state is indicated at 90 in FIG. 13. This vertical height is reduced when the switch blade member is sandwiched between metal plates 14, 16. In order to ensure good contact between the inner surface of plate 14 and the end of switch blade portion 30, vertical height 90 preferably is reduced by at least 15%, more preferably at least 20% and most preferably at least 25%. Although greater reductions in this vertical distance are possible, the maximum preferably is not greater than about 40% or such as to cause yielding of the metal. FIG. 14 shows switch blade portion 30 under bending stress between plates 14, 16 with a reduced vertical height 90a. By way of example, if height 90 is about 45–55 thousandths of an inch, height 90a is about 8–12 thousandths of an inch smaller.

Figure 15:
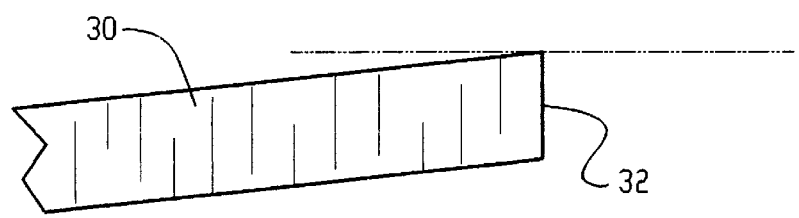
FIG. 15 is an enlarged side elevational view of an end portion of a switch blade.
Figure 16:
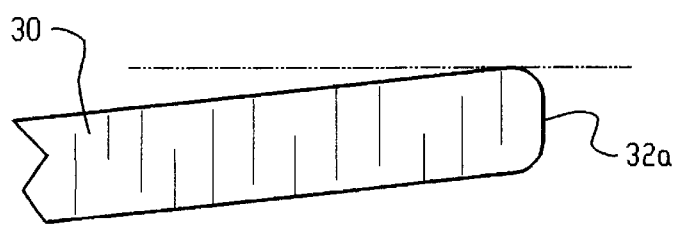
FIG. 16 is an enlarged side elevational view of a modified end portion of a switch blade.

FIG. 15 shows end 32 of switch blade portion 30 as having a relatively sharp edge at the intersection of the upper surface of the blade portion with the blade end. This edge makes substantially line contact with the inner surface of metal plate 14 in the switch closed position. FIG. 16 shows a rounded end 32a that still will make essentially line contact with the inner surface of plate 14. Although many other end shapes may be provided, they essentially will make line contact with the inner surface of the metal plate. The line of engagement is between precious metal coatings on both the blade and the inner plate surface.

With reference to FIGS. 11 and 12, switch assembly A is attached to the battery terminal or the battery case so that heat is conducted to outer metal plate 16 that directly engages mounting portion 60 of switch blade member 10 for good heat transfer. Heat is conducted from the battery case or terminal to metal plate 16 and to switch blade member 10. The temperature of switch blade member 10 also is raised by $I^2R$ heating and can be constructed to operate at many different elevated temperatures. By way of example, the switch blade portion may move from its closed position to an open position at a temperature of about 65°–75° C. The switch can be constructed to open at an elevated temperature in the range of 60°–125°.

The heat that causes the switch to open may be from $I^2R$ heating, by conduction from the battery case and terminal, by convection from the environment in which the switch is installed, or from a combination of these. Reference to a thermal switch encompasses switches that respond to any one or more of these heat sources.

In the present application, the current carrying actuator and contact of shape memory metal defined by switch blade portion 30 is in its martensitic deformed shape in the switch closed position. At the elevated operating temperature, the switch blade portion assumes its austenitic recovered shape and moves to a switch open position. Upon cooling, the switch blade portion does not move back to its closed position so that the switch assembly functions as a one-way fuse. This is achieved principally by controlling the percent strain in the current carrying switchblade actuator in its deformed shape. Although the shape memory metal can be processed so that the switch would reclose upon cooling and the present application covers such arrangements, the most preferred arrangement is one in which the actuator does not fully return to its deformed shape from its recovered shape upon cooling.

All of the metal parts of the switch assembly, other than the nickel foil electrodes, preferably are plated with a precious metal such as silver, gold, platinum or palladium to provide good electrical conductivity. The plating is provided on both opposite surfaces of the metal plates and the switch blade member as well as on the outer peripheral surfaces thereof. It will be recognized that the precious metal coating could be applied in ways other than electroplating, such as by vacuum deposition or sputtering. Although it is preferred to coat the entire outer surfaces of the metal parts with a precious metal, it will be understood that localized coating of small areas may be possible for some applications. The coating is done before electrodes 18, 20 are attached.

Metal plates 14, 16 preferably are of brass or copper for good electrical conductivity and to minimize corrosion in the event the precious metal coating is nicked, scratched or otherwise broken. Although steel plates may be useable for some purposes, it is preferred to use metals that have corrosion properties similar to brass.

Without nickel foil terminals 18 and 20, one prototype switch assembly had a resistivity less than about 5 milliohms. With the nickel foil terminals, the switch assembly had a resistivity of about 8–12 milliohms. In accordance with the present application the switch assembly preferably has a resistivity less than 20 milliohms, more preferably less than about 12 milliohms and most preferably not greater than about 5 or 6 milliohms. With the nickel foil terminals, the resistivity preferably is less than 20 milliohms and more preferably less than about 12 milliohms. The extremely low resistivity is achieved by a combination of features that include coating all metal surfaces with a precious metal, assembling the switch under sufficient compression to insure good engagement between the mounting portion of the switch blade member and the inner surface of a metal plate, and providing a switch blade actuator with sufficient stiffness and placing it in sufficient bending stress to insure good contact between the outer end of the blade and the inner surface of the outer plate.

The diameter of the fastener projections on the spacer and the diameter of the holes that receive the projections are dimensioned to provide a close fit. When the term "about" is used in this application, it means plus or minus 10% unless otherwise indicated or otherwise understood from the context in which it is used.

The improved switch assembly of the present application enables miniaturization and examples of dimensions will be given simply by way of illustration. Metal plates 14, 16 each has a thickness of about 0.01 inch, a length of about 0.535 inch and a width of about 0.207 inch. Switch blade member 10 has a thickness of about 0.01 inch and an overall length in its flat condition of about 0.375 inch, a mounting portion width of about 0.206 inch and a switch blade portion length of about 0.250 inch. Spacer 12 has a thickness of about 0.025 inch, a length of about 0.535 inch and a width of about 0.206 inch. The rectangular opening in the spacer has a length of about 0.285 inch and a width of about 0.156 inch. Notch 54 has a depth of about 0.01 inch, and the overall thickness between the opposite ends of projections 40, 42 and 44, 46 is about 0.055 inch. With the mounting portion of the switch blade member received in the spacer notch, the overall external thickness of the switch assembly between the outwardly facing surfaces of plates 14, 16 is about 0.045 inch.

The depth of notch 54 in spacer 12 preferably is not greater than the thickness of switch blade member 10, and preferably is slightly less in order to ensure good compressive contact between the inner surface of plate 16 and mounting portion 60 of switch blade member 10. The spacer material is more compressible than the metal switch blade member. Therefore, even when the notch is approximately the same depth as the thickness of the switch blade member, there is good contact between the mounting portion and plate 16 due to the high compressive force applied to the assembly while the fastener projections are deformed.

FIGS. 17–19 show another embodiment of a switch assembly G having substantially flat top and bottom metal plates 114 and 116. Each plate 114 and 116 has a central projection 115 and 117 extending outwardly from one end thereof to define terminals for connecting the switch assembly in a circuit.

Figure 21:
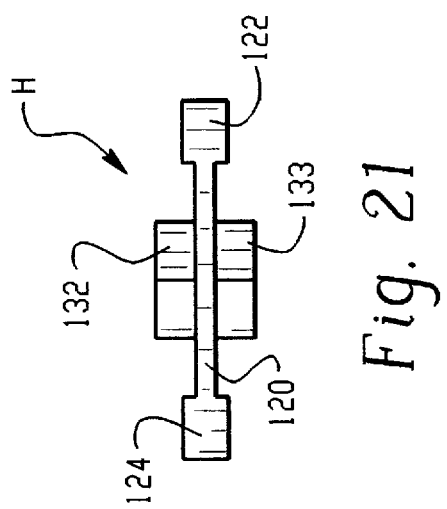
FIG. 21 is an end elevational view thereof.
Figure 20:
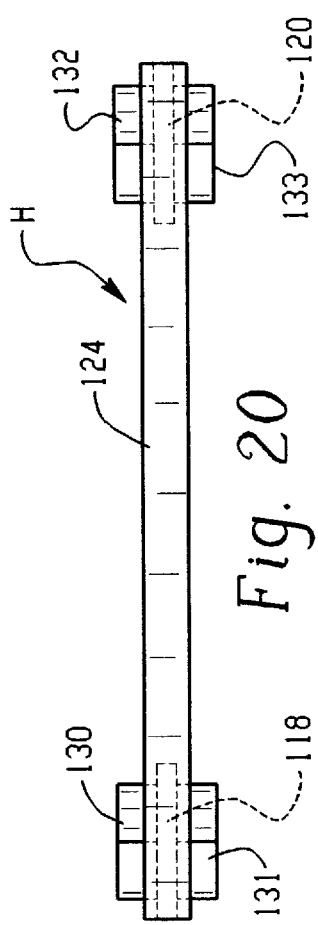
FIG. 20 is a side elevational view of a spacer used with the embodiment of FIGS. 17–19.
Figure 22:
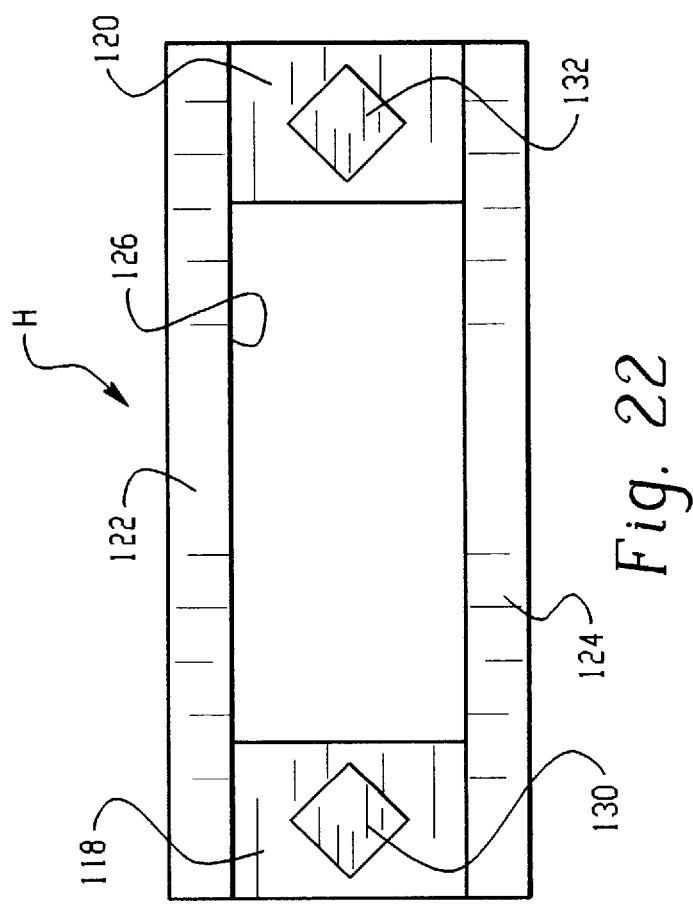
FIG. 22 is a top plan view thereof.

FIGS. 20–22 show a substantially rectangular spacer H having opposite end portions 118 and 120 of reduced thickness. Spacer side rails 122 and 124 extend the full length of spacer H and are thicker than end portions 118, 120. Spacer H has a central rectangular opening 126 bounded by end portions 118, 120 and side rails 122, 124. As shown in FIG. 21, end portion 120 has a thickness that is substantially less than the thickness of side rails 122, 124 and is substantially centered between the upper and lower surfaces of the rails to define upper and lower notches at each end portion of spacer H. Each notch is located between side rails 122, 124 on opposite sides of end portions 118, 120. Thus, spacer H is substantially symmetrical and can be used in either of two inverted positions or two end-for-end positions.

Non-circular fastener projections 130–133 are centrally located on opposite sides of end portions 118 and 120. In the arrangement shown, the non-circular projections are substantially square in cross-sectional shape. The fastener projections are also rotated approximately 45° so that the sides of the square projections extend at approximately 45° angles to side rails 122, 124. The fastener projections may also be considered to be substantially diamond-shaped in section and other non-circular shapes may be provided.

Each of the four notches at the opposite end portions of spacer H has a depth that is slightly less than the mounting portion of a switch blade member to be received therein. For example, when a switch blade member has a thickness of about 0.01 inch, each notch will have a depth of about 0.007 inch.

Figure 23:
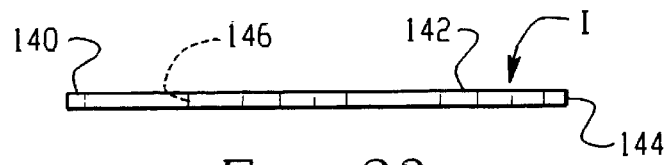
FIG. 23 is a side elevational view of a current carrying switch blade actuator and contact of shape memory alloy used with the embodiment of FIGS. 17–19.
Figure 24:
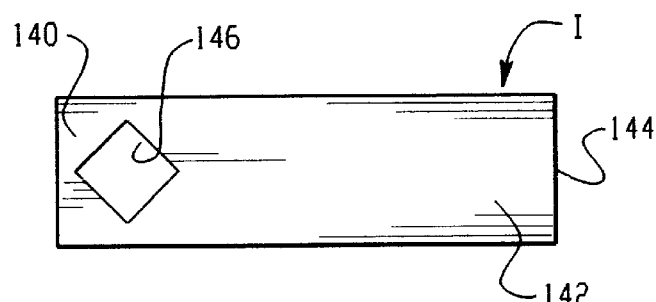
FIG. 24 is a top plan view thereof.

FIGS. 23 and 24 show a rectangular switch blade member I of shape memory alloy. A current carrying switch blade actuator and contact portion 142 extends outwardly from mounting portion 140 and terminates at an outer end 144. A rectangular or diamond-shaped hole 146 is centrally located in mounting portion 140 and is rotated so that its sides extend at substantially 45° to the side edges of rectangular switch blade member I. Fastener projections 130 and 133 and opening 146 are dimensioned for a close fit. The width of switch blade member I is slightly smaller than the width of a notch between side rails 122, 124 of spacer H. By way of example, with a switch blade member having a width of about 0.093 inch, the width of a notch is about 0.126 inch. This ensures that the switch blade portion will not hang up on the side rails during movement thereof and allows for tolerances in assembly. The non-circular shape of the projections and the corresponding shape of the hole in the switch blade member provide automatic proper orientation of the switch blade member during assembly.

Figure 25:
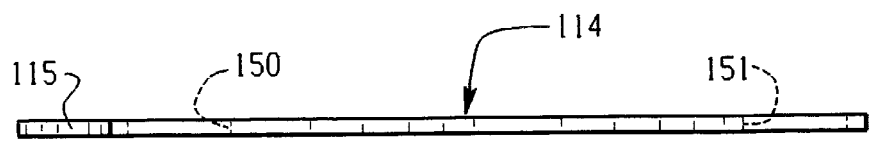
FIG. 25 is a side elevational view of a plate used in the embodiment of FIGS. 17–19.
Figure 26:
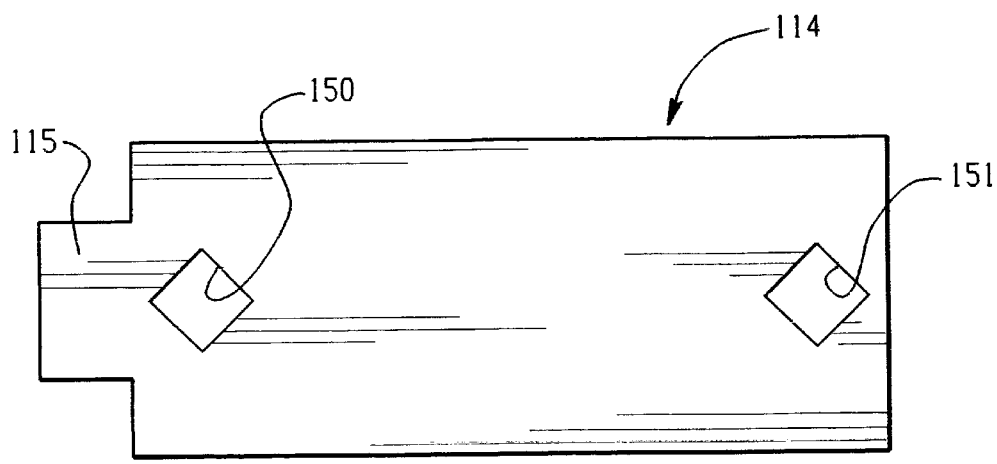
FIG. 26 is a top plan view thereof.

FIGS. 25 and 26 show substantially flat and rectangular metal plate 114 with integral centrally located terminal 115 extending outwardly from one end thereof. Square or diamond-shaped holes 150 and 151 are centrally located on the longitudinal center line of plate 114 adjacent the opposite ends thereof. Holes 150 and 151 are rotated approximately 45° so that there sides extend at approximately 45° angles to the sides of plate 114. Holes 150 and 151 are spaced-apart the same distance of two fastener projections such as 130 and 132 on spacer H. Holes 150 and 151 are also dimensioned for closely receiving fastener projections 130–133 which have a length sufficient to extend externally of the plates for deformation thereof by heat or ultrasonic energy to secure the assembled parts under compression.

The arrangement shown and described with respect to FIGS. 17–26 facilitates manufacture and assembly because spacer H requires no orientation. Both the top and bottom plates are the same and the switchblade member is mountable in any one of four notches in the spacer.

Although the switch assembly has been shown and described with respect to a normally closed arrangement, it will be recognized that normally open switches can be constructed by using features of the present application. The switch assembly can be used in other temperature monitoring applications to open a circuit or to close a circuit and sound an alarm. For example, a normally open switch arrangement could be used in fire alarms and would move to a switch closed position in response to an elevated temperature to sound an audible signal.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A thermal switch comprising a dielectric spacer sandwiched between a pair of substantially flat metal plates to define a cavity between said plates, a switch blade member having a mounting portion sandwiched between said dielectric spacer and one of said metal plates, said switch blade member having a switch blade portion extending into said cavity, said switch blade portion being of shape memory metal and having a normally closed position in engagement with the other of said metal plates to provide a current path between said metal plates, and said switch blade portion of shape memory metal responding to an elevated temperature by moving to an open position out of engagement with the other of said metal plates to interrupt the current path between said metal plates, and fasteners integral with said dielectric spacer and cooperating with said metal plates to hold said metal plates together with said spacer and said mounting portion of said switch blade member compressively sandwiched therebetween.

2. The switch of claim 1 wherein said switch blade portion remains in said open position upon cooling substantially below said elevated temperature.

3. The switch of claim 1 wherein said metal plates have inner surfaces facing toward said cavity and said switch blade member has opposite surfaces, and at least said inner surfaces of said metal plates and said opposite surfaces of said switch blade member being coated with a precious metal.

4. The switch of claim 3 wherein said switch blade member has a peripheral surface that is coated with a precious metal.

5. The switch of claim 1 wherein said switch is encapsulated in an electrical insulating material and further including an electrical terminal attached to each of said metal plates and projecting externally of said electrical insulating material.

6. The switch of claim 1 wherein said switch blade portion has a terminal end that engages said other metal plate with substantially line contact in said closed position thereof.

7. The switch of claim 1 wherein said switch has a resistance less than 20 milliohms.

8. The switch of claim 1 wherein said fasteners comprise a plurality of fastener projections on said dielectric spacer extending toward said metal plates, said metal plates having openings therein receiving said projections, and said fastener projections being deformed on the opposite sides of said metal plates from said spacer.

9. The switch of claim 8 wherein said fastener projections have non-circular cross-sectional shapes and said openings are similarly shaped.

10. The switch of claim 1 wherein said metal plates have opposite ends and said fasteners are located adjacent said opposite ends.

11. The switch of claim 1 wherein said dielectric spacer has a continuous peripheral portion surrounding said cavity.

12. The switch of claim 1 wherein said dielectric spacer has at least one reduced thickness end portion defining at least one notch in which said mounting portion of said switch blade member is received.

13. The switch of claim 12 wherein said notch has a depth that is not greater than the thickness of said mounting end portion of said switch blade member.

14. The switch of claim 1 wherein said spacer has reduced thickness opposite end portions defining four notches and said mounting portion of said switch blade member being received in one of said notches.

15. The switch of claim 1 wherein said switch blade member has a thickness that is not greater than the thickness of said spacer.

16. The switch of claim 1 wherein said spacer has a thickness that is not greater than about 0.050 inches.

17. The switch of claim 1 wherein said metal plates and said spacer are substantially rectangular and said spacer has a substantially rectangular spacer opening therein to define said cavity.

18. The switch of claim 17 wherein said rectangular spacer opening has a width substantially greater than one-half the width of said spacer and a length that is not less than one-half the length of said spacer and not greater than three-fourths the length of said spacer to provide opposite spacer end areas connected by spacer webs.

19. The switch of claim 17 wherein said spacer has spacer end areas at opposite ends of said spacer opening, said spacer end areas having integral fastener projections extending outwardly from opposite sides thereof toward said metal plates, said fastener projections having a length greater than the thickness of said metal plates, said metal plates having holes receiving said fastener projections, and said fastener projections being deformed and enlarged on the opposite sides of said metal plates from said spacer.

20. The switch of claim 1 wherein said metal plates have outer surfaces and said switch has a thickness across said outer surfaces that is not greater than about 0.045 inches.

21. The switch of claim 1 wherein said switch blade member is substantially T-shaped.

22. The switch of claim 1 wherein said metal plates have opposite end portions and at least one of said end portions on at least one of said metal plates has a terminal member attached thereto.

23. The switch of claim 1 wherein said switch blade portion has a curved configuration and is in less than about 8% bending strain.

24. The switch of claim 1 wherein said spacer has a tensile strength of at least 15,000 psi.

25. The switch of claim 1 wherein said spacer has a heat deflection temperature at 264 psi of at least 500° F.

26. The switch of claim 1 including a battery having a battery case and a battery terminal, one of said metal plates being attached to one of said battery case and battery terminal.

27. The switch of claim 26 wherein said battery case has a recess therein and said switch is received in said recess.

28. In a battery having a battery case and a battery terminal, a thermal switch assembly attached to one of said battery case and battery terminal externally of said battery case, said switch assembly including a dielectric spacer sandwiched between a pair of metal plates and defining a cavity therebetween, a switch blade member of shape memory metal having a mounting portion sandwiched between one of said metal plates and said spacer, said switch blade member having a switch blade portion extending into said cavity and being under bending stress in engagement with the other of said metal plates, said switch blade portion being movable out of engagement with said other of said metal plates in response to an elevated temperature, and fasteners integral with said dielectric spacer and cooperating with said metal plates to hold said metal plates together with said spacer and said mounting portion of said switch blade member compressively sandwiched therebetween.

29. A thermal switch assembly comprising a dielectric spacer and a switch blade member compressively sandwiched between a pair of metal plates, said spacer having a surface notch therein facing toward one of said metal plates and said switch blade member having a mounting portion received in said notch, and said notch having a depth that is not greater than the thickness of said mounting portion, and fasteners integral with said dielectric spacer and cooperating with said metal plates to hold said metal plates together with said spacer and said mounting portion of said switch blade member compressively sandwiched therebetween.

30. The switch assembly of claim 27 wherein said notch has a depth that is at least about 90% of the thickness of said mounting portion.

* * * * *